United States Patent
Werling et al.

(10) Patent No.: US 12,521,411 B2
(45) Date of Patent: Jan. 13, 2026

(54) AZITHROMYCIN PREMIX FORMULATION AND PRODUCT, METHODS OF PREPARING SAME, AND METHODS OF USING SAME

(71) Applicants: Baxter International Inc., Deerfield, IL (US); Baxter Healthcare SA, Glattpark (CH)

(72) Inventors: Jane Werling, Arlington Heights, IL (US); Melissa R. Wilson, Ingleside, IL (US); Amanda Bayer, Waunakee, WI (US)

(73) Assignees: BAXTER INTERNATIONAL INC., Deerfield, IL (US); BAXTER HEALTHCARE SA, Glattpark (CH)

( * ) Notice: Subject to any disclaimer, the term of this patent is extended or adjusted under 35 U.S.C. 154(b) by 0 days.

(21) Appl. No.: 19/196,922

(22) Filed: May 2, 2025

(65) Prior Publication Data

US 2025/0339456 A1 Nov. 6, 2025

Related U.S. Application Data

(60) Provisional application No. 63/643,043, filed on May 6, 2024.

(51) Int. Cl.
*A61K 31/7052* (2006.01)
*A61K 47/02* (2006.01)

(52) U.S. Cl.
CPC .......... *A61K 31/7052* (2013.01); *A61K 47/02* (2013.01)

(58) Field of Classification Search
None
See application file for complete search history.

(56) References Cited

U.S. PATENT DOCUMENTS

| | | | |
|---|---|---|---|
| 677,829 | A | 7/1901 | Wescher et al. |
| 6,277,829 | B1 | 8/2001 | Asero et al. |
| 8,153,601 | B2 | 4/2012 | Suzuki et al. |
| 9,044,508 | B2 | 6/2015 | Bowman et al. |
| 9,339,553 | B2 | 5/2016 | Zhang et al. |
| 10,342,816 | B2 | 7/2019 | Aleo et al. |
| 2005/0054587 | A1 | 3/2005 | Culic et al. |
| 2007/0021359 | A1 | 1/2007 | Cosme Gomez et al. |
| 2007/0185194 | A1 | 8/2007 | Mehta et al. |
| 2008/0096831 | A1 | 4/2008 | Sadatrezaei et al. |
| 2018/0042953 | A1 | 2/2018 | Violin et al. |
| 2019/0209466 | A1 | 7/2019 | Benita et al. |

FOREIGN PATENT DOCUMENTS

| | | |
|---|---|---|
| CN | 1046945 | 11/1990 |
| CN | 1123279 | 5/1996 |
| CN | 1270723 | 10/2000 |
| CN | 1559613 | 1/2005 |
| CN | 1663615 | 9/2005 |
| CN | 101103992 | 1/2008 |
| CN | 101524360 | 9/2009 |
| CN | 101683532 | 3/2010 |
| CN | 102125577 | 7/2011 |
| CN | 103211755 | 7/2013 |
| CN | 104055729 | 9/2014 |
| CN | 106668862 | 5/2017 |
| CN | 108210450 | 6/2018 |
| CN | 108210453 | 6/2018 |
| CN | 108721625 | 11/2018 |
| CN | 109381707 | 2/2019 |
| CN | 111214437 | 6/2020 |
| CN | 112791050 | 5/2021 |
| CN | 114796110 | 7/2022 |
| CN | 118557591 | 8/2024 |
| EP | 4031244 | 7/2022 |
| EP | 4374848 | 5/2024 |

(Continued)

OTHER PUBLICATIONS

Beaney, Alison M. "Quality assurance of aseptic preparation services: standards." Part A. Fifth edition. Rpharms. Com/Portals/0/RPS% 20document% 20library/Open 20 (2016).*

*Primary Examiner* — Patrick T Lewis
(74) *Attorney, Agent, or Firm* — K&L Gates LLP

(57) ABSTRACT

An aseptically prepared pharmaceutically acceptable azithromycin premix formulation has a pH value of 5.5 to 7.5, preferably 6.0 to 7.0, more preferably 6.3 to 7.0, even more preferably 6.3 to 6.7, for example about 6.5. Preferred embodiments of the aseptically prepared pharmaceutically acceptable azithromycin premix formulation contain azithromycin, a buffering agent, water and optionally a tonicity adjusting agent and are stable for one month, three months, six months, nine months, twelve months, fifteen months, eighteen months or even twenty-four months, during storage at refrigerated temperatures, such as about 5° C., even without any additional components beyond the azithromycin, the buffering agent, and the optional tonicity adjusting agent in the premix formulation. The pharmaceutically acceptable azithromycin premix formulation may be aseptically filled into a container, preferably a glass or flexible container, to form a sterile pharmaceutical azithromycin premix product which does not undergo terminal sterilization. The azithromycin premix product can be a single use premix which is a sterile, stable and ready-to-use aqueous solution for parenteral administration, for example intravenous (IV) administration such as IV infusion, and requires no dilution prior to parenteral administration.

21 Claims, 13 Drawing Sheets

(56) References Cited

FOREIGN PATENT DOCUMENTS

| | | |
|---|---|---|
| IN | 20130436214 | 10/2015 |
| JP | 2020203882 | 12/2020 |
| RU | 2563826 | 9/2015 |
| RU | 2666607 | 9/2018 |
| WO | 2002007736 | 1/2002 |

* cited by examiner

AZITHROMYCIN PREMIX FORMULATION AND PRODUCT, METHODS OF PREPARING SAME, AND METHODS OF USING SAME

CROSS REFERENCE TO RELATED APPLICATIONS

This application claims priority to U.S. Provisional Application No. 63/643,043 filed May 6, 2024, the entire contents of which are incorporated herein by reference.

TECHNICAL FIELD

The present disclosure generally relates to an aseptically prepared pharmaceutically acceptable azithromycin premix formulation having a pH of 5.5 to 7.5. In some embodiments, the pH of the aseptically prepared pharmaceutically acceptable azithromycin premix formulation is 6.0 to 7.0, for example 6.3 to 7.0. In particularly preferred embodiments, the aseptically prepared pharmaceutically acceptable azithromycin premix formulation has a pH of 6.3 to 6.7, such as about 6.5, and maintains a pH of 6.2 to 6.8 over shelf-life. Some embodiments of the aseptically prepared pharmaceutically acceptable azithromycin premix formulation contain azithromycin, a buffering agent, water, and optionally a tonicity adjusting agent. The pharmaceutically acceptable azithromycin premix formulation may be aseptically filled into a container, preferably a glass or flexible container, without terminal sterilization, to form a sterile pharmaceutical azithromycin premix product. The aseptically filled azithromycin premix product can be a single use premix which is a sterile, stable and ready-to-use aqueous solution for parenteral administration, for example intravenous (IV) administration such as IV infusion, and requires no dilution prior to parenteral administration.

BACKGROUND

Azithromycin, a derivative of erythromycin, is an azalide macrolide antibiotic. Azithromycin is used to treat or prevent certain bacterial infections such as laryngitis, bronchitis, pneumonia, typhoid, non-gonococcal urethritis, chlamydia, gonorrhea, or cervicitis. The chemical structure of azithromycin is shown in FIG. 1.

Azithromycin is available commercially as an intravenous infusion product. The current commercial product containing azithromycin for intravenous infusion is sold as a lyophilized powder in single-use vials that must be reconstituted and diluted prior to use. According to the prescribing information, each single-use vial contains 500 mg of azithromycin (as azithromycin dihydrate), 384.6 mg of anhydrous citric acid, and sodium hydroxide.

Two aseptic preparation steps must be performed to administer the current commercial product containing azithromycin. In the first step, the lyophilized powder is reconstituted as a 100 mg/mL concentrate in 4.8 mL of sterile water for injection and can be stored for 24 hours when stored below 30° C. (86° F.). The infusion product is then prepared by further diluting the reconstituted product in a second aseptic preparation step, typically to a concentration of 1-2 mg/mL in a diluent such as 0.9% sodium chloride injection or 5% dextrose injection. The diluted infusion product is stable for up to 24 hours at or below room temperature or for seven days under refrigeration at 5° C. (41° F.).

However, there is no single usage, sterile, stable and ready-to-use IV infusion system available for azithromycin.

WO2002/007736 purports to disclose a clear liquid pharmaceutical composition of azithromycin, but this publication does not teach aseptic preparation and instead uses terminal sterilization of the premix product, by autoclaving the solution in vials. Furthermore, this publication does not teach the alleged stability of this product over any particular time or particular temperature.

SUMMARY

Applicant produced an aseptically prepared pharmaceutically acceptable azithromycin premix formulation having a pH of 5.5 to 7.5. In some embodiments, the pH of the aseptically prepared pharmaceutically acceptable azithromycin premix formulation is 6.0 to 7.0, for example 6.3 to 7.0. In particularly preferred embodiments, the aseptically prepared pharmaceutically acceptable azithromycin premix formulation has a pH of 6.3 to 6.7, such as a pH of about 6.5, and maintains a pH of 6.2 to 6.8 over shelf-life. Preferred embodiments of the aseptically prepared pharmaceutically acceptable azithromycin premix formulation contain azithromycin, a buffering agent, water, and optionally a tonicity adjusting agent, such as saline. The aseptically prepared pharmaceutically acceptable azithromycin premix formulation is stable for one month, three months, six months, nine months, twelve months, fifteen months, eighteen months or even twenty-four months, during storage at refrigerated temperatures, such as about 5° C., even without any additional components beyond the azithromycin, the buffering agent, and the optional tonicity adjusting agent in the premix formulation. In some embodiments, the pH of the aseptically prepared pharmaceutically acceptable azithromycin premix formulation stays within a range of 6.2 to 6.8 over shelf-life, e.g., twenty-four months storage at refrigeration temperatures of 2° C. to 8° C. (e.g., about 5° C.), with thirty days storage at room temperature (about 25° C.) after the refrigerated storage.

For example, the aseptically prepared pharmaceutically acceptable azithromycin premix formulation may have no greater than about 4.0% total impurities (% w/w), for example no greater than about 3.0% total impurities (% w/w), and/or may have total desosaminylazithromycin (Impurity J) and 14-demethyl-14-(hydroxymethyl)azithromycin (Impurity D) no greater than 2.0% (% w/w), for shelf-life (twenty-four months storage at about 5° C., then thirty days room temperature (about 25° C.)), as measured by the UPLC method disclosed herein, even without any additional components beyond the azithromycin, the buffering agent, and the optional tonicity adjusting agent in the premix formulation.

The present disclosure also relates to methods of making and using the aseptically prepared pharmaceutically acceptable azithromycin premix formulation. The pharmaceutically acceptable azithromycin premix formulation may be aseptically filled into a flexible container to form a pharmaceutical azithromycin premix product, and preferably the container is sealed and stored with the pharmaceutically acceptable azithromycin premix formulation therein, without terminal sterilization. The aseptically filled azithromycin premix product can be a single usage premix which is a sterile, stable and ready-to-use aqueous solution for parenteral administration, for example intravenous administration such as intravenous infusion.

Indeed, as set forth in the experimental examples later herein, Applicant found significant degradation of azithromycin and a corresponding increase in total impurities when units were exposed to terminal sterilization temperatures.

Overall, there were significant differences in pH, assay, and impurities between terminally sterilized units compared to control units.

The present disclosure also relates to methods of making and using the aseptically filled azithromycin premix product. For example, the aseptically filled azithromycin premix product can be parenterally administered to an individual to treat a bacterial infection in the individual. Additionally or alternatively, the aseptically filled azithromycin premix product can be parenterally administered to any individual that has been prescribed azithromycin. The aseptically filled azithromycin premix product can be parenterally administered without any reconstitution or dilution prior to the parenteral administration.

Furthermore, the aseptically filled azithromycin premix product as disclosed and prepared herein is a single usage premix and is ready to be administered intravenously to an individual in need thereof without requiring further dilution. Therefore, the aseptically filled azithromycin premix product disclosed herein eliminates the necessity to prepare an azithromycin IV infusion system diluted from the currently available azithromycin commercial products shortly before the starting of azithromycin IV infusion. Consequently, the aseptically filled azithromycin premix product would significantly reduce medical errors in dispensing and administering azithromycin and dramatically improve safety and efficiency in using azithromycin in hospitals nationally.

DETAILED DESCRIPTION

Definitions

Figure 1:
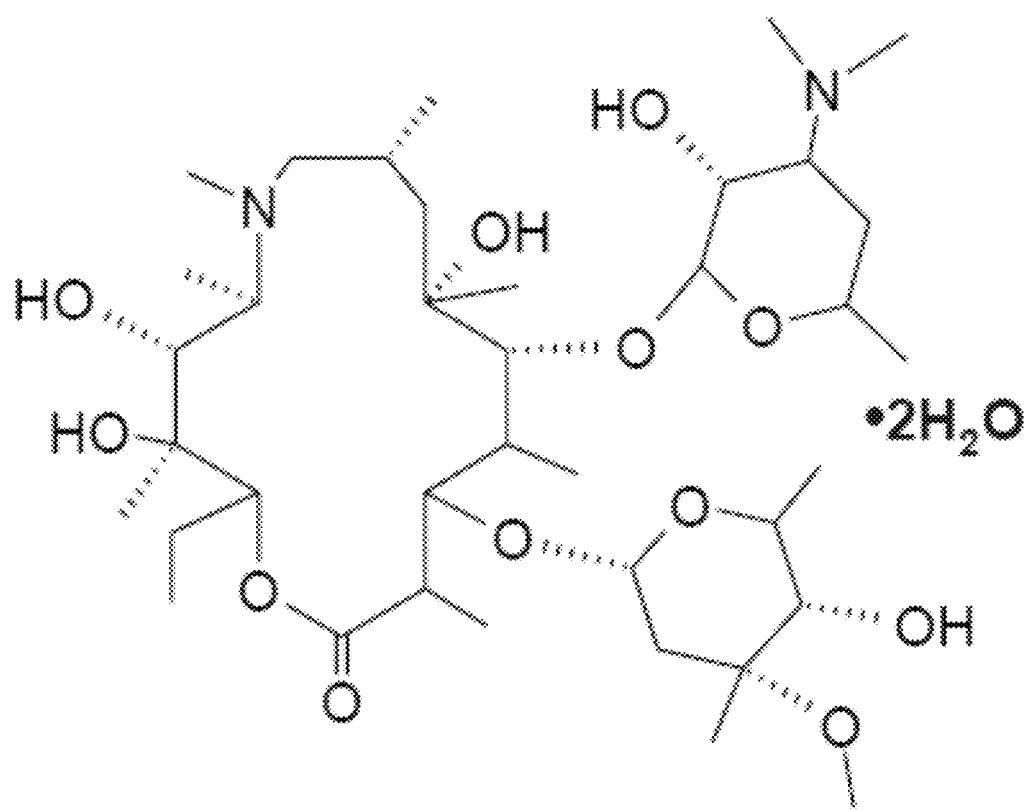
FIG. 1 shows the chemical structure of azithromycin.

Some definitions are provided hereafter. Nevertheless, definitions may be located in the "Embodiments" section below, and the above header "Definitions" does not mean that such disclosures in the "Embodiments" section are not definitions.

As used in this disclosure and the appended claims, the term "premix" is a ready-to-use aqueous solution suitable for direct administration to patients, including IV infusion, without requiring further dilution. Preferably, the premix solution is supplied as a sterile solution, and is stable over its shelf life as described herein.

As used in this disclosure and the appended claims, the term "sterile" is understood to mean free from any bacteria or other living microorganisms.

As used in this disclosure and the appended claims, the term "iso-osmotic" is understood to mean having the same osmolality as an individual's body fluids or blood, typically from about 255 to about 345 mOsm/kg.

As used in this disclosure and the appended claims, the term "shelf-life" of the azithromycin premix formulation or product is understood to mean at least twelve months, preferably at least twenty-four months, stored at refrigeration temperatures of 2° C. to 8° C.; optionally with thirty days stored at room temperature of about 25° C. after the refrigerated storage.

Total impurities (% w/w) and total impurities J+D (desosaminylazithromycin and 14-demethyl-14-(hydroxymethyl)azithromycin) (% w/w) as disclosed and claimed herein are measured by a UPLC method using the following parameters:

| Parameter | Description | | |
|---|---|---|---|
| Column | Waters Acquity BEH C18 Column, 1.7 μm, 2.1 mm × 150 mm | | |
| Detector | Diode Array Detector | | |
| Solution 1 | 1.8 mg/mL sodium phosphate dibasic pH 8.9 | | |
| Solution 2 | Acetonitrile and Methanol (3:1) | | |
| Mobile Phase A | 60% Solution 1:40% Solution 2 | | |
| Mobile Phase B | 30% Solution 1:70% Solution 2 | | |
| Gradient: | Time (min) | % A | % B |
| | 0.0 | 90.0 | 10.0 |
| | 5.0 | 35.0 | 65.0 |
| | 10.5 | 18.5 | 81.5 |
| | 17.5 | 18.5 | 81.5 |
| | 17.7 | 90.0 | 10.0 |
| | 22.0 | 90.0 | 10.0 |
| Flow rate | 0.61 mL/min | | |
| Detector wavelength | 210 nm | | |
| Column temp | 60 ± 2° C. | | |
| Injection volume | 20 μL | | |
| Autosampler Temp | 5° C. | | |
| Run time | 22 minutes | | |

-continued

| Sample Prep | Neat Injection (2 mg/mL) |
|---|---|
| Standard Prep | 0.1 mg/mL USP Azithromycin RS |

UPLC for the azithromycin assay and impurities test method uses the following peaks table:

| Impurity Name | RRT | RRF | RRF$^{-1}$ |
|---|---|---|---|
| Impurity 3 (CAS No. 90503-06-3) | 0.16 | 1.0 | 1.0 |
| Impurity RRT 0.21 | 0.21 | N/A | N/A |
| Impurity RRT 0.23 | 0.23 | N/A | N/A |
| Impurity L (Azithromycin N-oxide) | 0.39 | 0.43 | 2.326 |
| Impurity M (3'-(N,N-Didemethyl)-3'N-formylazithromycin) | 0.47 | 1.17 | 0.588 |
| Impurity E (3'-(N,N-Didemethyl) azithromycin (aminoazithromycin)) | 0.50 | 1.0 | 1.0 |
| Impurity RRT 0.54 | 0.54 | 1.0 | 1.0 |
| Impurity F (Azithromycin related compound F) | 0.57 | 3.8 | 0.263 |
| Impurity J (Desosaminylazithromycin) + Impurity D (14-demethyl-14-(hydoxymethyl)azithromycin) | 0.58 | 1.0 | 1.0 |
| Impurity Gy (3'-N-{[4-(Acetylamino)phenyl]sulfonyl}-3'-3'-didemethylazithromycin) | 0.59 | 12.0 | 0.083 |
| Impurity I (N-Demethylazithromycin) | 0.61 | 1.0 | 1.0 |
| Impurity K (C14.1''-epoxyazithromycin) | 0.63 | 1.0 | 1.0 |
| Erythromycin A oxime | 0.64 | 1.0 | 1.0 |
| Impurity C (Azithromycin C (3''-O-demethylazithromycin)) | 0.73 | 1.0 | 1.0 |
| Impurity H (3'-N-{[4-(Acetylamino)phenyl]sulfonyl}-3'-demethylazithromycin) | 0.75 | 10.0 | 0.1 |
| Impurity N (3'-De(dimethylamino)-3'-oxoazithromycin) | 0.76 | 1.5 | 0.667 |
| Impurity A (Azaerythromycin A) | 0.81 | 1.0 | 1.0 |
| Impurity P (Azithromycin impurity P) | 0.91 | 1.0 | 1.0 |
| Azithromycin | 1.0 | — | — |
| Impurity O (2-Desethyl-2-propylazithromycin) | 1.29 | 1.0 | 1.0 |
| Impurity G (3'-N-Demethyl-3'-N-[(4-methylphenyl)sulfonyl]azithromycin | 1.36 | 5.0 | 0.2 |
| Impurity B (3'-Deoxyazithromycin (azithomycin B)) | 1.43 | 1.0 | 1.0 |
| Any other individual impurity | — | 1.0 | 1.0 |

Note:
RRF = relative response factor, see RRF-1 for Empower Chromatography System RRF Field As used in this disclosure and the appended claims, "tonicity adjusting agent" is an excipient added to injectable preparations to prevent osmotic shock at the site of injection upon administration, and thereby reduce local irritation. Typical excipients used for tonicity adjustment include saline, glycerin, mannitol, dextrose and trehalose. Tonicity is a colligative property that depends primarily on the number of dissolved particles in solution. Hence, the amount of the tonicity adjusting agent to be added depends on the specific formulation. In some embodiments, a tonicity agent and amount thereof establish an osmolality of 255 to 345 mOsm/kg for the pharmaceutically acceptable azithromycin premix formulation.

All percentages expressed herein are by weight of the total weight of the composition unless expressed otherwise. When reference herein is made to the pH, values correspond to pH measured at about 25° C. with standard equipment.

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

All numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used in this disclosure and the appended claims, the singular forms "a," "an" and "the" include plural referents unless the context clearly dictates otherwise. Thus, for example, reference to "a component" or "the component" includes two or more components.

The words "comprise," "comprises" and "comprising" are to be interpreted inclusively rather than exclusively. Likewise, the terms "include," "including," "containing" and "having" should all be construed to be inclusive, unless such a construction is clearly prohibited from the context. Further in this regard, these terms specify the presence of the stated features but not preclude the presence of additional or further features.

Nevertheless, the compositions and methods disclosed herein may lack any element that is not specifically disclosed herein. Thus, a disclosure of an embodiment using the term "comprising" is (i) a disclosure of embodiments having the identified components or steps and also additional components or steps, (ii) a disclosure of embodiments "consisting essentially of" the identified components or steps, and (iii) a disclosure of embodiments "consisting of" the identified components or steps. Any embodiment disclosed herein can be combined with any other embodiment disclosed herein.

The term "and/or" used in the context of "X and/or Y" should be interpreted as "X," or "Y," or "X and Y." Similarly, "at least one of X or Y" should be interpreted as "X," or "Y," or "X and Y." For example, "azithromycin monohydrate and/or azithromycin dihydrate" should be interpreted as "azithromycin monohydrate," or "azithromycin dihydrate," or "both azithromycin monohydrate and azithromycin dihydrate."

Where used herein, the terms "example" and "such as," particularly when followed by a listing of terms, are merely exemplary and illustrative and should not be deemed to be exclusive or comprehensive.

A "subject" or "individual" is a mammal, preferably a human. As used herein, an "effective amount" is an amount that prevents a deficiency, treats a disease or medical condition in an individual, or, more generally, reduces symptoms, manages progression of the disease, or provides a nutritional, physiological, or medical benefit to the individual.

The terms "treatment" and "treat" include both prophylactic or preventive treatment (that prevent and/or slow the development of a targeted pathologic condition or disorder) and curative, therapeutic or disease-modifying treatment, including therapeutic measures that cure, slow down, lessen symptoms of, and/or halt progression of a diagnosed pathologic condition or disorder; and treatment of patients at risk of contracting a disease or suspected to have contracted a disease, as well as patients who are ill or have been diagnosed as suffering from a disease or medical condition. The terms "treatment" and "treat" do not necessarily imply that a subject is treated until total recovery. The terms "treatment" and "treat" also refer to the maintenance and/or promotion of health in an individual not suffering from a disease but who may be susceptible to the development of an unhealthy condition. The terms "treatment" and "treat" are also intended to include the potentiation or otherwise enhancement of one or more primary prophylactic or therapeutic measures. As non-limiting examples, a treatment can be performed by a patient, a caregiver, a doctor, a nurse, or another healthcare professional.

The term "unit dosage form," as used herein, refers to physically discrete units suitable as unitary dosages for human and animal subjects, each unit containing a predetermined quantity of the composition disclosed herein in amount sufficient to produce the desired effect, in association with a pharmaceutically acceptable diluent, carrier or vehicle. The specifications for the unit dosage form depend on the particular compounds employed, the effect to be achieved, and the pharmacodynamics associated with each compound in the host.

The term "pharmaceutically acceptable" as used herein refers to substances that do not cause substantial adverse allergic or immunological reactions when administered to a subject.

The terms "substantially no," "essentially free" or "substantially free" as used in reference to a particular component means that any of the component present constitutes less than about 3.0% by weight, such as less than about 2.0% by weight, less than about 1.0% by weight, preferably less than about 0.5% by weight or, more preferably, less than about 0.1% by weight.

As used herein, "aseptically filled" and "aseptically prepared" are interchangeable and mean the azithromycin premix formulation and the container are separately manipulated or handled in such a way to avoid microbial, fungal and viral contamination, instead of a treatment to destroy, inactivate or remove any contaminants already present. Then the azithromycin premix formulation is filled into the container in a sterile environment. The "aseptically filled"/"aseptically prepared" formulation disclosed herein has not been subjected to any temperature at or greater than about 120° C., preferably has not been subjected to any temperature at or greater than about 100° C., and is not subjected to any such temperature at any stage of manufacturing or use. In some embodiments, aseptic filling/preparation comprises the formulation having been sterile filtered, for example through a filter having a pore size of 0.2 micron. "Terminal sterilization" means sterilization of a formulation in its final container, such as by autoclaving.

EMBODIMENTS

Applicant found that storage temperature and pH of the aseptically prepared premixed solution greatly affects the stability of the azithromycin and impurity formation, as shown in the experimental examples herein. Accordingly, an aspect of the present disclosure is an aseptically prepared pharmaceutically acceptable azithromycin premix formulation having a pH of 5.5 to 7.5, preferably 6.0 to 7.0, more preferably 6.3 to 7.0, even more preferably 6.3 to 6.7, for example a pH of about 6.5, and stable for one month, three months, six months, nine months, twelve months, fifteen months, eighteen months or even twenty-four months, during storage at refrigerated temperatures, for example at about 5° C., even without any additional components beyond the azithromycin, a buffering agent, and an optional tonicity adjusting agent such as saline in the premix formulation. In some embodiments, the pH of the aseptically prepared pharmaceutically acceptable azithromycin premix formulation begins at 6.3 to 6.7 and then stays within a range of 6.2 to 6.8 over shelf-life, e.g., at least twelve months or at least twenty-four months storage at refrigeration temperatures of 2° C. to 8° C. (e.g., about 5° C.), optionally with thirty days stored at room temperature of about 25° C. after the refrigerated storage.

For example, the aseptically prepared azithromycin premix formulation may have no greater than about 4.0% total impurities (% w/w), for example no greater than about 3.0% total impurities (% w/w), and/or may have total desosaminylazithromycin (Impurity J) and 14-demethyl-14-(hydroxymethyl)azithromycin (Impurity D) no greater than 2.0% (% w/w), for shelf-life of at least twelve months or at least twenty-four months storage at about 5° C., optionally with thirty days stored at room temperature of about 25° C. after the refrigerated storage, as measured by the UPLC method disclosed herein, even without any additional components beyond the azithromycin, the buffering agent, and the optional tonicity adjusting agent such as saline in the premix formulation.

Non-limiting examples of the aseptically prepared pharmaceutically acceptable azithromycin premix formulations may comprise azithromycin in a concentration of about 1.0 mg/mL to about 3.0 mg/mL, preferably about 2.0 mg/mL by volume of the formulation. The concentration of azithromycin in the premix formulations as disclosed herein is preferably the final concentration for direct administration to patients, and the formulation does not require any further dilution, or addition of any extra ingredient which is not already in the azithromycin premix formulation.

The azithromycin premix formulation is an aqueous solution that may be aseptically filled into a flexible container, without terminal sterilization, to form a pharmaceutically acceptable azithromycin premix product. The azithromycin premix product is preferably a sterile, stable and ready-to-use aqueous solution. The azithromycin premix product is preferably a single usage product. The azithromycin premix product is preferably clear and colourless. The azithromycin formulation can be administered to an individual, for example by intravenous injection from the flexible container. The individual may have or be at risk of bacterial infection, such as laryngitis, bronchitis, pneumonia, typhoid, non-gonococcal urethritis, *chlamydia*, gonorrhea, or cervicitis. The individual is a mammal, preferably a human such as an adult or a child.

Preferably the aseptically prepared pharmaceutically acceptable azithromycin premix formulation comprises sodium chloride (NaCl) as a tonicity adjusting agent. Non-limiting examples of the concentration of sodium chloride are preferably about 0.855%-0.945%, most preferably about 0.9% by weight of the total formulation.

Preferably the aseptically prepared pharmaceutically acceptable azithromycin premix formulation comprises a buffering agent selected from the group consisting of citrate, histidine, phosphate, tryptophan, maleate, carbonate and mixtures thereof, for example citrate and/or phosphate, most preferably anhydrous citric acid and/or sodium phosphate monobasic monohydrate.

Non-limiting examples of the concentration of the buffering agent include about 0.5 mg/mL to about 2.5 mg/mL, preferably about 0.75 mg/mL to about 2.25 mg/mL, more preferably about 1.0 mg/mL to about 2.0 mg/mL, and most preferably about 1.25 mg/mL to about 1.75 mg/mL by total volume of the formulation.

A non-limiting preferred embodiment is an aseptically prepared pharmaceutically acceptable azithromycin premix formulation containing (i) azithromycin, of which at least a portion is preferably azithromycin monohydrate and/or azithromycin dihydrate; (ii) a buffering agent, of which at least a portion is preferably a citrate buffer (e.g., anhydrous citric acid) and/or a phosphate buffer (e.g., sodium phosphate monobasic monohydrate); (iii) an optional tonicity adjusting agent, for example sodium chloride; and (iv) water, for example an amount of water suitable to form an aqueous solution.

In some embodiments, the aseptically prepared pharmaceutically acceptable azithromycin premix formulation consists essentially of the azithromycin, the buffering agent, the optional tonicity adjusting agent, and the water. In some embodiments, the aseptically prepared pharmaceutically acceptable azithromycin premix formulation consists of the azithromycin, the buffering agent, the optional tonicity adjusting agent, and the water.

In a particularly preferred non-limiting embodiment, the aseptically prepared pharmaceutically acceptable azithromycin premix formulation contains about 2 mg/mL of azithromycin, as azithromycin monohydrate and/or azithromycin dihydrate; about 1.65 mg/mL of anhydrous citric acid or about 1.38 mg/mL of sodium phosphate monobasic monohydrate; about 0.9% of sodium chloride; and water.

In some embodiments, the aseptically prepared pharmaceutically acceptable azithromycin premix formulation consists essentially of the azithromycin, the anhydrous citric acid or sodium phosphate monobasic monohydrate, the sodium chloride, and the water. In some embodiments, the azithromycin premix formulation consists of the azithromycin, the anhydrous citric acid or sodium phosphate monobasic monohydrate, the sodium chloride, and the water.

The pharmaceutically acceptable azithromycin premix formulation may be aseptically filled into a container, preferably a glass or flexible container to form a sterile pharmaceutical azithromycin premix product, without terminal sterilization. In this regard, the azithromycin premix formulation does not undergo any sterilization during filling into the container or after filling into the container. The aseptically filled azithromycin premix product can be a single use premix which is a sterile, stable and ready-to-use aqueous solution for parenteral administration, for example intravenous (IV) administration such as IV infusion, and requires no dilution prior to parenteral administration. The container may be sealed with the pharmaceutically acceptable azithromycin premix formulation within the container and then stored, for example at the shelf-life conditions disclosed herein.

Non-limiting examples of the flexible container may be a flexible plastic container having an inner surface contacting the azithromycin solution, wherein the inner surface may be made of a plastic material, or a layer of plastic material. Preferred plastic materials for the inner surface contacting the azithromycin solution include polyethylene (PE), linear low density polyethylene (LLDPE), polyvinyl chloride (PVC), polypropylene (PP), copolymer, and modified polymer or copolymer. For example, the inner surface of the flexible container may be made of a flexible PE or LLDPE.

In some embodiments, the flexible container is a 250 mL GALAXY® single dose flexible container intended for intravenous drug infusion, such as GALAXY®. The GALAXY® flexible container may be made of a single polymeric layer or multiple layers bonded together or co-extruded. These film layers may comprise polymers such as, but not limited to, polyolefins, polyethers, and polyamides (nylon, for example). The inner surface of the GALAXY® flexible container is polyethylene (PE) or a layer of PE, which contacts the drug solution inside the bag.

In some embodiments, the aseptically prepared pharmaceutically acceptable azithromycin premix formulation may further comprise a pH-adjusting agent, such as sodium hydroxide (NaOH) and/or hydrochloric acid (HCl).

Another aspect of the present disclosure is a method for manufacturing an aseptically prepared pharmaceutically acceptable azithromycin premix formulation. Non-limiting examples of the method preferably comprise adding azithromycin to water and mixing until homogenous to form an aqueous solution, for example at a concentration of azithromycin that is about 2.0 mg/mL; and adjusting the pH of the aqueous solution to 6.3 to 6.7, for example about 6.5. The pH adjustment may be performed at one or more times selected from the group consisting of (i) before adding the azithromycin to the water, (ii) during adding the azithromycin to the water, (iii) after adding azithromycin to the water, (iv) and any combination thereof.

Non-limiting examples of the method for manufacturing the aseptically prepared pharmaceutically acceptable azithromycin premix formulation further comprise adding at least one tonicity adjuster, such as sodium chloride, and/or at least one buffering agent, such as anhydrous citric acid or sodium phosphate monobasic monohydrate, to water and mixing until homogenous.

Non-limiting examples of the method for manufacturing the aseptically prepared pharmaceutically acceptable azithromycin premix formulation may preferably involve aseptic manufacturing and container filling and sealing techniques for drug products according to known methods in the art, including but not limited to passing the aqueous solution through a filter, but without terminal sterilization.

Non-limiting examples of the method for manufacturing the aseptically prepared pharmaceutically acceptable azithromycin premix formulation may preferably exclude adding dextrose.

Non-limiting examples of the method for manufacturing the aseptically prepared pharmaceutically acceptable azithromycin premix formulation use sodium hydroxide (NaOH) as a base and/or hydrochloric acid (HCl) as an acid, to adjust the pH value of the aqueous solution. Additionally or alternatively, some embodiments of the method for manufacturing the aseptically prepared pharmaceutically acceptable azithromycin premix formulation may use anhydrous citric acid and/or sodium phosphate monobasic monohydrate as an acidic or basic buffering agent to adjust the pH of the aqueous solution.

At least a portion of these steps in the method for manufacturing the aseptically prepared pharmaceutically acceptable azithromycin premix formulation may optionally be performed at about 2° C. to about 8° C., for example approximately 5° C. or, additionally or alternatively, at ambient conditions, i.e., a temperature of about 25° C. and a pressure of about 1.0 atm. In some embodiments, each ingredient is mixed until completely homogenous before adding the next ingredient.

Non-limiting examples of the method for manufacturing the aseptically prepared pharmaceutically acceptable azithromycin premix formulation preferably further comprise storing the azithromycin premix formulation in a sealed container, without any terminal sterilization, for example for a time period of one month, three months, six months, nine months, twelve months, fifteen months or even twenty-four months, at refrigerated temperatures, for example at about 5° C. In some embodiments, the pH of the pharmaceutically acceptable azithromycin premix formulation stays within a range of 6.2 to 6.8 over shelf-life, e.g., at least twelve months or at least twenty-four months storage at refrigeration temperatures of 2° C. to 8° C. optionally with thirty days stored at room temperature of about 25° C. after the refrigerated storage. The azithromycin premix formulation disclosed herein can be substantially unchanged by such storage (e.g., appearance, colour, pH, azithromycin concentration, and/or impurities). The container may be a glass container or a flexible container such as a plastic bottle or bag.

Non-limiting examples of the pharmaceutically acceptable azithromycin premix product comprises the pharmaceutically acceptable azithromycin premix formulation as disclosed and prepared herein above and a flexible container assembly, wherein the azithromycin premix formulation is aseptically filled into the flexible container assembly without terminal sterilization.

Non-limiting examples of the flexible container assembly may comprise a flexible container and optionally one or more port assemblies.

Non-limiting examples of the flexible container may have a volume of about 1.0 mL-1000.0 mL, preferably about 5.0-750.0 mL, more preferably about 50.0-500.0 mL and most preferably about 250.0 mL. The flexible container may be a flexible plastic container. The flexible container has an inner surface contacting the azithromycin premix formulation, wherein the inner surface is preferably made of a plastic material or a layer of plastic material. The plastic material is preferably selected from a group of polyethylene (PE), linear low density polyethylene (LLDPE), polyvinyl chloride (PVC), polypropylene (PP), copolymer, and modified polymer or copolymer. For example, the inner surface of the flexible container may be a PE. In one embodiment, the flexible container is a 250 mL GALAXY® single dose flexible container.

Another aspect of the present disclosure is an aseptically filled pharmaceutically acceptable azithromycin premix product comprising a pharmaceutically acceptable azithromycin premix formulation in a flexible container assembly (preferably sealed in the assembly), wherein the pharmaceutically acceptable azithromycin premix formulation is prepared as disclosed herein above.

Another aspect of the present disclosure is a method of manufacturing an aseptically filled pharmaceutically acceptable azithromycin premix product. The method comprises 1) adding azithromycin to water and mixing until homogenous to form an aqueous solution with azithromycin in a concentration of about 2.0 mg/mL; 2) adjusting pH of the aqueous solution to a value of 6.3 to 6.7, for example 6.4 to 6.6 or about 6.5; 3) sterilizing a flexible container assembly; and 4) aseptically filling the aqueous solution to a flexible container assembly without terminal sterilization. Optionally the aqueous solution further comprises at least one tonicity adjusting agent (e.g., sodium chloride) and/or at least one buffer (e.g., a citrate buffer and/or a phosphate buffer).

Non-limiting examples of the method for manufacturing the aseptically filled pharmaceutically acceptable azithromycin premix product may comprise: 1) all the steps as disclosed above in the method for preparing the pharmaceutically acceptable azithromycin premix formulation as disclosed herein above; 2) sterilizing a flexible container assembly; and 3) aseptically filling the pharmaceutically acceptable azithromycin premix formulation as disclosed and prepared above into the sterilized flexible container assembly, without terminal sterilization.

Non-limiting examples of the flexible container assembly may comprise a flexible container and may further comprise at least one port assembly.

Another aspect of the present disclosure is a method of treating a bacterial infection in an individual having the bacterial infection. Still another aspect of the present disclosure is a method of preventing or reducing at least one of a risk, a severity, or an incidence of a bacterial infection in an individual who does not yet have the bacterial infection. The bacterial infection may be laryngitis, bronchitis, pneumonia, typhoid, non-gonococcal urethritis, *chlamydia*, gonorrhea, or cervicitis. The individual is a mammal, preferably a human such as an adult or a child.

These methods comprise administering an effective amount of an aseptically prepared pharmaceutically acceptable azithromycin premix formulation to the individual, wherein the pharmaceutically acceptable azithromycin premix product is as disclosed and prepared above, and may be administered from any of the products disclosed herein, such as the aseptically filled azithromycin premix formulation in a flexible container. Some embodiments of the method for administering the effective amount of the aseptically prepared pharmaceutically acceptable azithromycin premix product may include parenteral administration, for example intravenous administration, such as IV injection and IV infusion.

Preferably, the intravenous administration is IV infusion at room temperature such as about 25° C.

EXAMPLES

The following non-limiting examples support the embodiments of the aseptically prepared pharmaceutically acceptable azithromycin premix formulation disclosed herein.

Example 1

A study investigated the stability of four azithromycin premix formulations as a function of temperature. Each premixed formulation contained 2 mg/mL azithromycin monohydrate formulation in 1.65 mg/mL citric acid buffer and one of 0.9% sodium chloride or 5% dextrose diluent. The azithromycin in saline was adjusted to a pH of 6.0 or 6.6, and the azithromycin in dextrose was adjusted to a pH of 5.7 or 7.0. Formulations were filtered through a 0.2 μm filter, filled as 8 mL fill into 10 mL glass ampoules and flame sealed.

Units passed visual inspection at all temperatures, and units did not discolor.

After 20 days at 40° C., premix units in saline showed ≤0.1 pH unit decrease, and premix units in dextrose showed ≤0.25 pH unit decrease. Premix units prepared at lower pH in either saline or dextrose showed no pH change when stored at 40° C. for 20 days.

After 6 months at 25° C., premix units in saline showed ≤0.1 pH unit decrease, while premix units in dextrose showed ≤0.15 pH unit decrease after 3 months at 25° C. Premix units prepared at lower pH in either saline or dextrose showed no pH change during 3 months storage at 25° C.

After 6 months at 5° C., no pH change was observed for any of the units.

After 20 days at 40° C., premix units in saline had dropped to approximately 91% of initial potency, and units in dextrose to about 84% of initial potency. Premix units prepared at lower pH in either saline or dextrose had dropped to 91-92% of initial potency after 20 days at 40° C.

After 3 months at 25° C., premix units in saline had dropped to approximately 95% of initial potency, whereas premix units in dextrose had dropped to approximately 89% of initial potency. Premix units prepared at lower pH in either saline or dextrose had dropped to 91-92% of initial potency after 3 months at 25° C. After 6 months at 25°, premix units in saline had dropped to approximately 88-89% of initial potency.

After 6 months at 5° C., potency remained within +/−2% of initial concentration for premixes in saline and dextrose at the higher pH values. The premix units prepared at lower pH in either saline or dextrose had dropped to approximately 97% of initial potency.

In conclusion, units were found to be stable, by the test methods used in this study, for at least 6 months at 5° C. In general, units in saline were more stable than units in dextrose.

Example 2

A study evaluated the stability of a premixed 2 mg/mL azithromycin formulation in 0.9% sodium chloride diluent aseptically filled in 250 mL GALAXY® container system without terminal sterilization. The study compared the formulation at pH levels 6.3, 6.5 and 6.7 (Formulations A, B and C in Table 1) after long-term storage at 5° C. (24 months) and 25° C. (12 months).

TABLE 1

Formulations A, B, and C in Example 2

| Example | Azithromycin[1] | Tonicity Adjusting Agent | Buffer | pH |
|---|---|---|---|---|
| A | 2.0 mg/mL | 0.9% Saline | 1.65 mg/mL citric acid | 6.3 |
| B | 2.0 mg/mL | 0.9% Saline | 1.65 mg/mL citric acid | 6.5 |
| C | 2.0 mg/mL | 0.9% Saline | 1.65 mg/mL citric acid | 6.7 |

[1]Added as Azithromycin Dihydrate

Figure 2A:
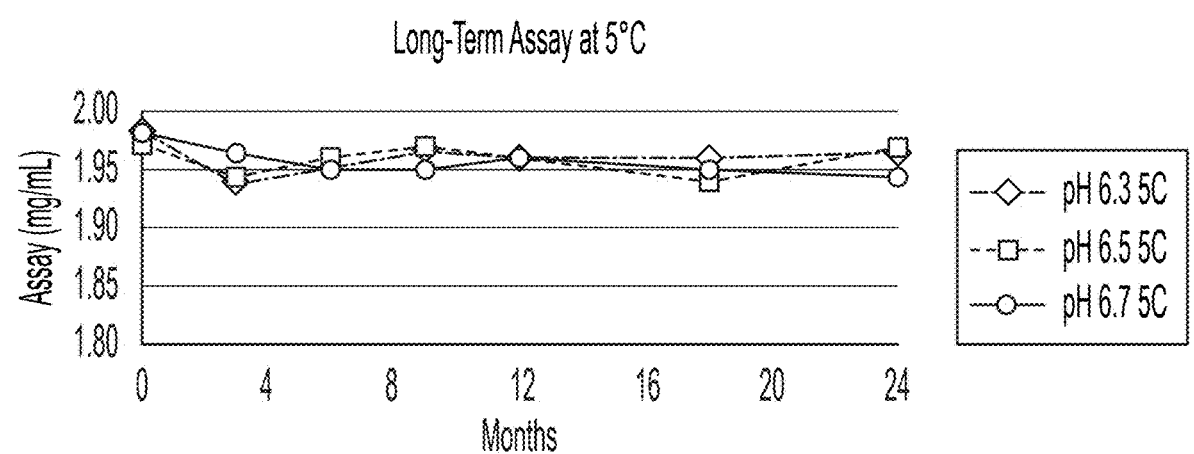
FIG. 2A is a graph showing results in Example 2 for azithromycin formulations A, B and C as measured by assay (mg/mL) change over time at 5° C. storage.

After 24 months (24M) of storage at 5° C., there was no significant assay loss for formulations A, B and C (Table 2; FIG. 2A). Compared to 5° C. storage, units stored for 12M at 25° C. experienced a greater assay loss over time (Table 2).

TABLE 2

Formulations A, B and C: Assay (mg/mL) over months storage

| Storage Temp | Example | 0 M | 3 M | 6 M | 9 M | 12 M | Change from 0 M to 12 M | 18 M | 24 M | Change from 0 M to 24 M |
|---|---|---|---|---|---|---|---|---|---|---|
| 5° C. | A | 1.98 | 1.94 | 1.95 | 1.97 | 1.96 | −0.02 | 1.96 | 1.96 | −0.02 |
|  | B | 1.97 | 1.94 | 1.96 | 1.97 | 1.96 | −0.01 | 1.94 | 1.97 | 0.00 |
|  | C | 1.98 | 1.96 | 1.95 | 1.95 | 1.96 | −0.02 | 1.95 | 1.94 | −0.04 |
| 25° C. | A | 1.98 | 1.89 | 1.87 | Not Tested | 1.79 | −0.19 | Not Tested | Not Tested | Not Tested |
|  | B | 1.97 | 1.89 | 1.86 |  | 1.78 | −0.19 |  |  |  |
|  | C | 1.98 | 1.89 | 1.83 |  | 1.72 | −0.26 |  |  |  |

Figure 2B:
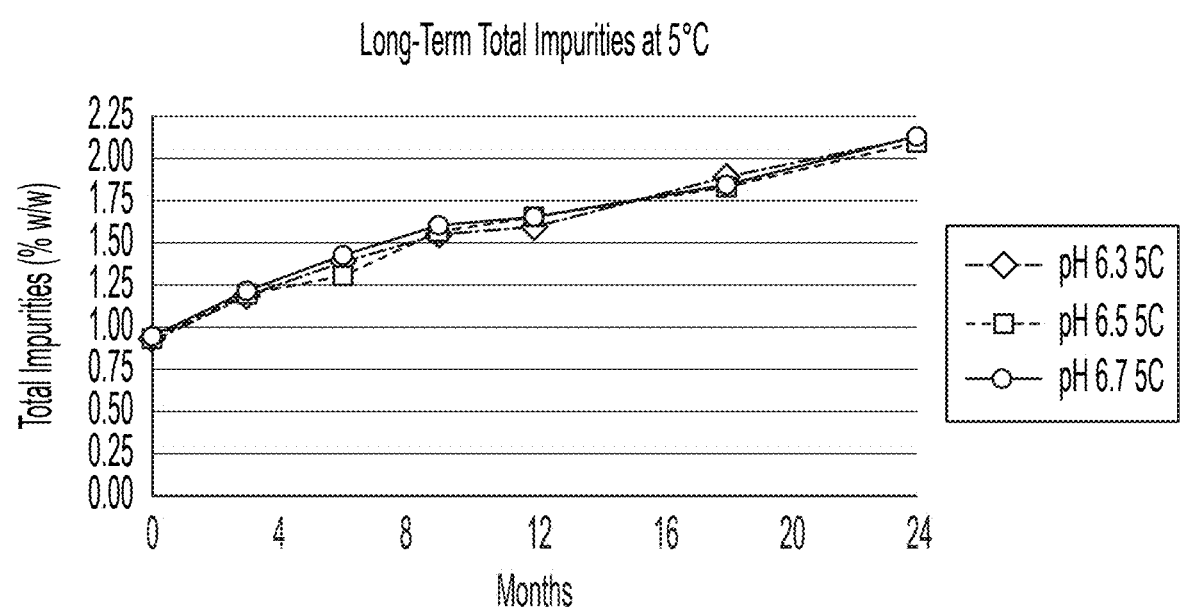
FIG. 2B is a graph showing results in Example 2 for azithromycin formulations A, B and C as measured by total impurities (% w/w) change over time at 5° C. storage.

All three formulations experienced similar growth in total impurities following 24M of storage at 5° C., as measured by UPLC (Table 3A; FIG. 2B). Total Impurities grow significantly at 25° C. storage, with a larger growth at pH 6.7 compared to pH 6.3 and pH 6.5 (Table 3A).

TABLE 3A

Formulations A, B and C: Total Impurities (% w/w) over months storage

| Storage Temp | Example | 0 M | 3 M | 6 M | 9 M | 12 M | Change from 0 M to 12 M | 18 M | 24 M | Change from 0 M to 24 M |
|---|---|---|---|---|---|---|---|---|---|---|
| 5° C. | A | 0.93 | 1.18 | 1.39 | 1.54 | 1.59 | +0.66 | 1.90 | 2.11 | +1.18 |
|  | B | 0.92 | 1.20 | 1.30 | 1.56 | 1.66 | +0.73 | 1.83 | 2.10 | +1.18 |
|  | C | 0.95 | 1.22 | 1.43 | 1.61 | 1.66 | +0.71 | 1.85 | 2.14 | +1.19 |

TABLE 3A-continued

Formulations A, B and C: Total Impurities (% w/w) over months storage

| Storage Temp | Example | 0 M | 3 M | 6 M | 9 M | 12 M | Change from 0 M to 12 M | 18 M | 24 M | Change from 0 M to 24 M |
|---|---|---|---|---|---|---|---|---|---|---|
| 25° C. | A | 0.93 | 4.27 | 7.05 | Not Tested | 10.87 | +9.94 | Not Tested | Not Tested | Not Tested |
|  | B | 0.92 | 4.22 | 7.49 |  | 11.13 | +10.20 |  |  |  |
|  | C | 0.95 | 4.46 | 7.42 |  | 12.24 | +11.29 |  |  |  |

All three formulations experienced similar growth in total impurities following 24M of storage at 5° C., as measured by UPLC (Table 3A; FIG. 2B). Total impurities grow significantly at 25° C. storage, with a larger growth at pH 6.7 compared to pH 6.3 and pH 6.5 (Table 3A).

Figure 3:
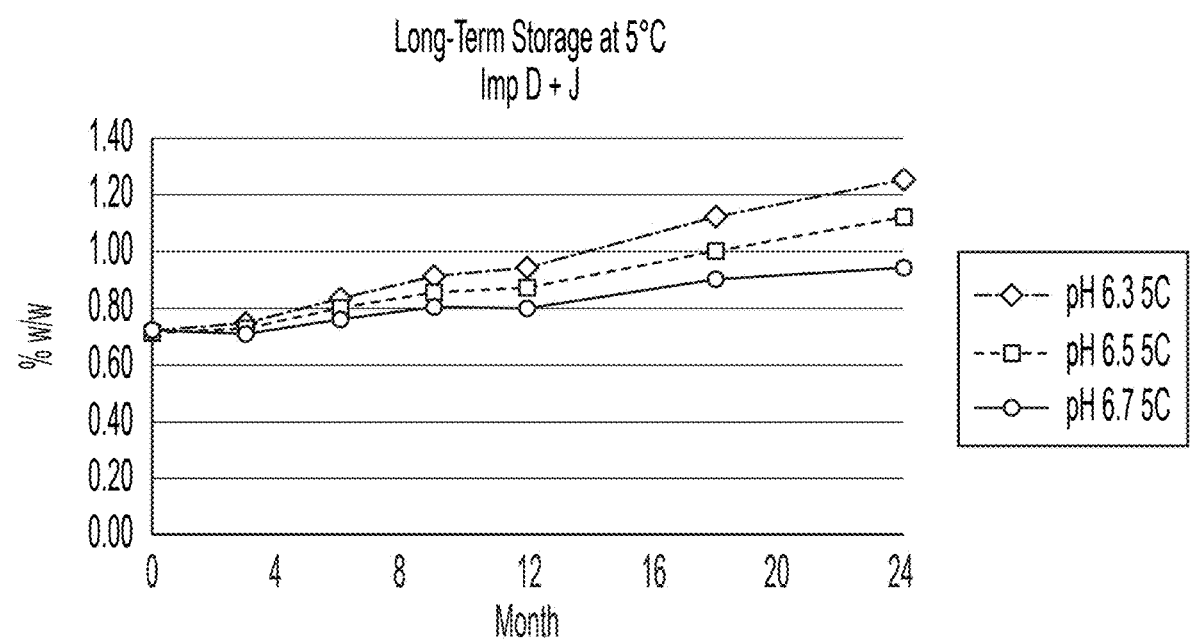
FIG. 3 is a graph showing results in Example 2 for azithromycin formulations A, B and C as measured by Impurities J+D (% w/w) change over time at 5° C. storage.

Regarding specific impurities, three impurities continued to grow over time throughout 5° C. storage: Impurity J+D, Impurity RRT 0.16 (CAS No. 90503-06-3, also known as Impurity 3), and Impurity RRT 0.54. Impurity 3 grew to a maximum of 0.56% w/w after 24-month 5° C. storage, with faster growth at more basic pH (pH 6.7). As shown in Table 3B and FIG. 3, Impurity J+D grew to a maximum of 1.25% w/w after 24-month 5° C. storage, with faster growth at more acidic pH (pH 6.3). Impurity RRT 0.54 grew to a maximum of 0.34% w/w after 24-month 5° C. storage regardless of the solution pH (6.3-6.7) and began to plateau after the 3-month interval. All three pH levels have approximately the same amount of Total Impurities at the 24-month 5° C. interval: pH 6.3: 2.11% w/w, pH 6.5: 2.10% w/w, and pH 6.7: 2.14% w/w. There was no significant change in any other impurity monitored (Impurities F, RRT 0.57, N, H, A, O, and B).

TABLE 3B

Formulations A, B and C: Impurities J + D (% w/w) over months

| Storage Temp | Example | 0 M | 3 M | 6 M | 9 M | 12 M | Change from 0 M to 12 M | 18 M | 24 M | Change from 0 M to 24 M |
|---|---|---|---|---|---|---|---|---|---|---|
| 5° C. | A | 0.72 | 0.75 | 0.84 | 0.91 | 0.94 | +0.22 | 1.12 | 1.25 | +0.53 |
|  | B | 0.71 | 0.73 | 0.80 | 0.86 | 0.87 | +0.16 | 1.00 | 1.12 | +0.41 |
|  | C | 0.72 | 0.71 | 0.76 | 0.81 | 0.80 | +0.08 | 0.89 | 0.94 | +0.22 |
| 25° C. | A | 0.72 | 2.07 | 3.42 | Not Tested | 6.08 | +5.36 | Not Tested | Not Tested | Not Tested |
|  | B | 0.71 | 1.68 | 2.73 |  | 4.78 | +4.07 |  |  |  |
|  | C | 0.72 | 1.33 | 2.06 |  | 3.56 | +2.84 |  |  |  |

Example 3

A study investigated a wider pH range than Example 2: pH levels 6.0, 6.5 (target), and 7.0 (Formulations D, E and F, Table 4). All formulations were aseptically filled in 250 mL GALAXY® container system without terminal sterilization.

TABLE 4

Formulations D, E, and F in Example 3

| Example | Azithromycin[1] | Tonicity Adjusting Agent | Buffer | pH |
|---|---|---|---|---|
| D | 2.0 mg/mL | 0.9% Saline | 1.65 mg/mL citric acid | 6.0 |
| E | 2.0 mg/mL | 0.9% Saline | 1.65 mg/mL citric acid | 6.5 |
| F | 2.0 mg/mL | 0.9% Saline | 1.65 mg/mL citric acid | 7.0 |

[1]Added as Azithromycin Dihydrate

Figure 4A:
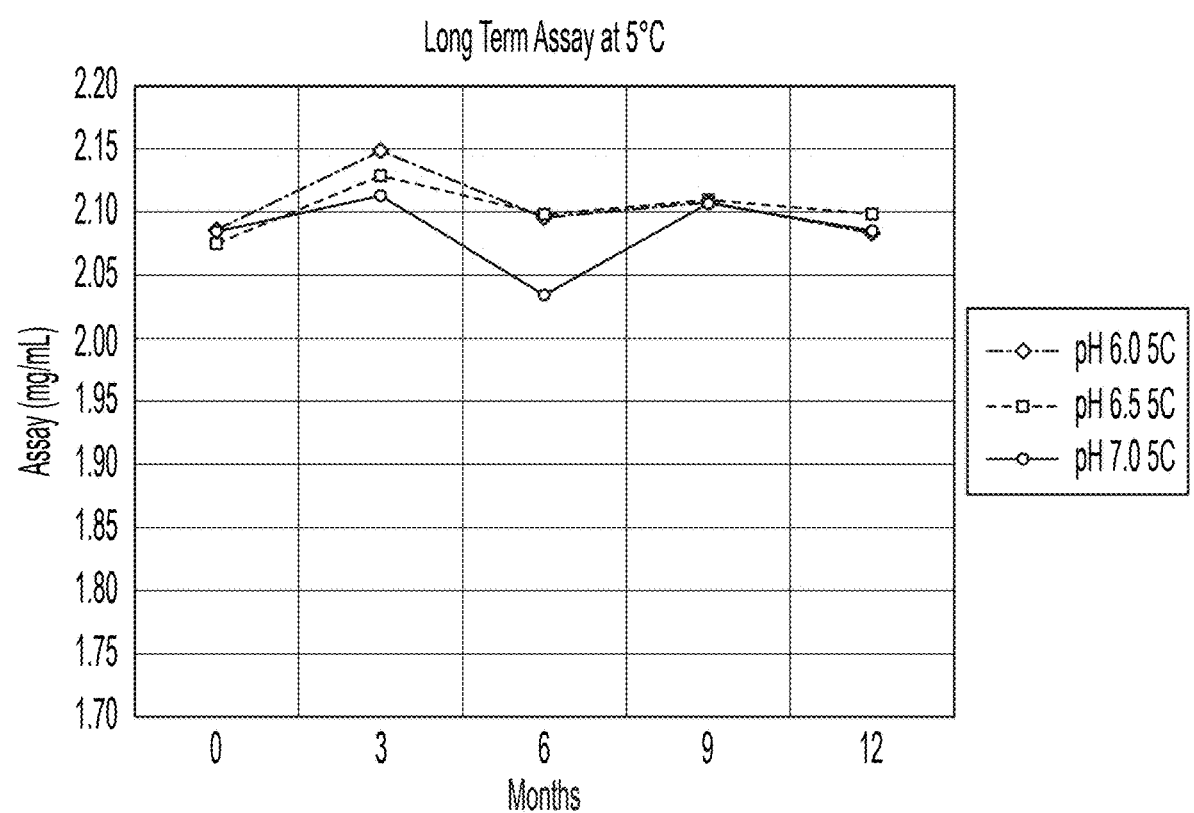
FIG. 4A is a graph showing results in Example 3 for azithromycin formulations D, E and F as measured by assay (mg/mL) change over time at 5° C. storage.

Similar to Example 2, there was no significant assay loss for formulations D, E and F over 12M of 5° C. storage (Table 5; FIG. 4A).

TABLE 5

Formulations D, E and F: Assay (mg/mL) over months at 5° C. storage

| Example | 0 M | 3 M | 6 M | 9 M | 12 M | Change from 0 M to 12 M |
|---|---|---|---|---|---|---|
| D | 2.09 | 2.15 | 2.10 | 2.11 | 2.08 | −0.01 |
| E | 2.07 | 2.13 | 2.10 | 2.11 | 2.10 | +0.03 |
| F | 2.08 | 2.11 | 2.03 | 2.11 | 2.09 | +0.01 |

Figure 4B:
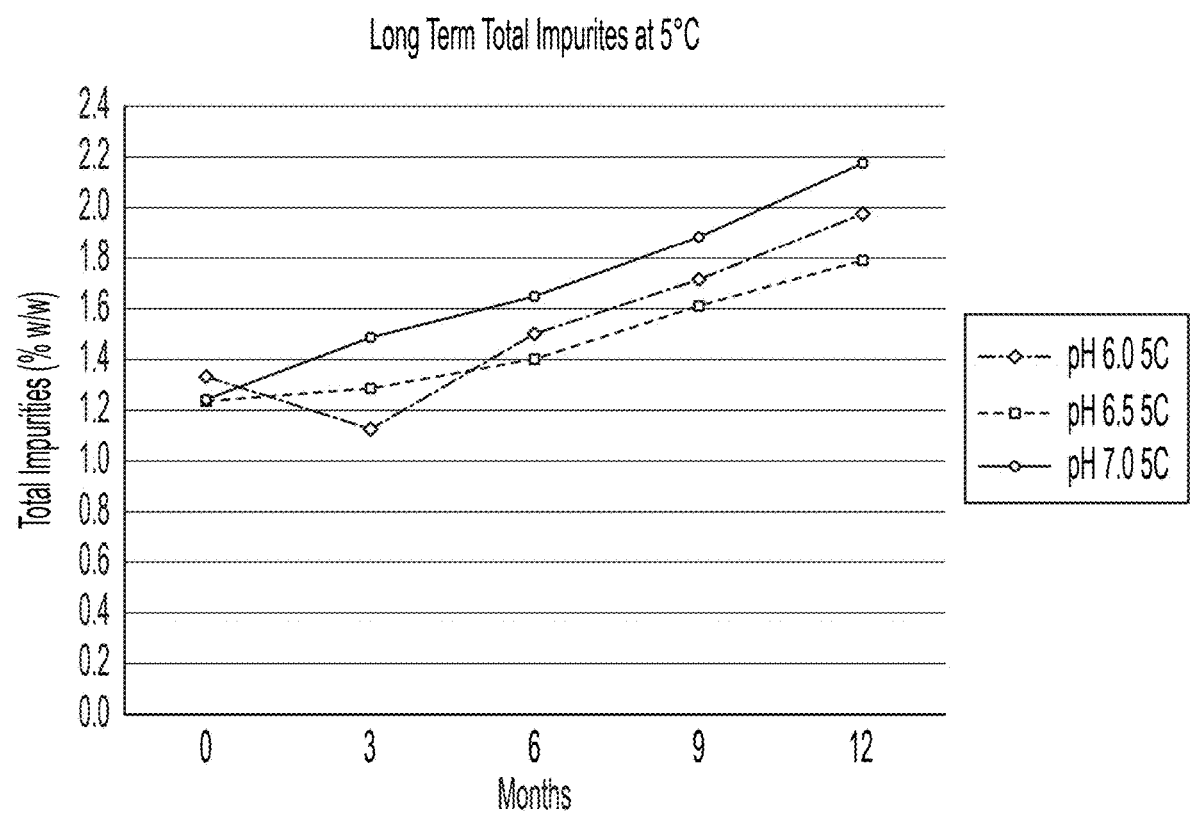
FIG. 4B is a graph showing results in Example 3 for azithromycin formulations D, E and F as measured by total impurities (% w/w) change over time at 5° C. storage.

Formulation E experienced the lowest total impurities growth over 12M of 5° C. storage compared to Formulations D and F, as measured by UPLC (Table 6A; FIG. 4B). Samples formulated at pH 6.5 showed the least amount of assay degradation across all storage conditions, and greatest control over impurity growth.

TABLE 6A

Formulations D, E and F: Total Impurities (% w/w) over months at 5° C. storage

| Example | 0 M | 3 M | 6 M | 9 M | 12 M | Change from 0 M to 12 M |
|---|---|---|---|---|---|---|
| D | 1.33 | 1.13 | 1.50 | 1.72 | 1.98 | +0.65 |
| E | 1.24 | 1.29 | 1.40 | 1.61 | 1.79 | +0.55 |
| F | 1.24 | 1.49 | 1.65 | 1.88 | 2.18 | +0.94 |

Figure 5A:
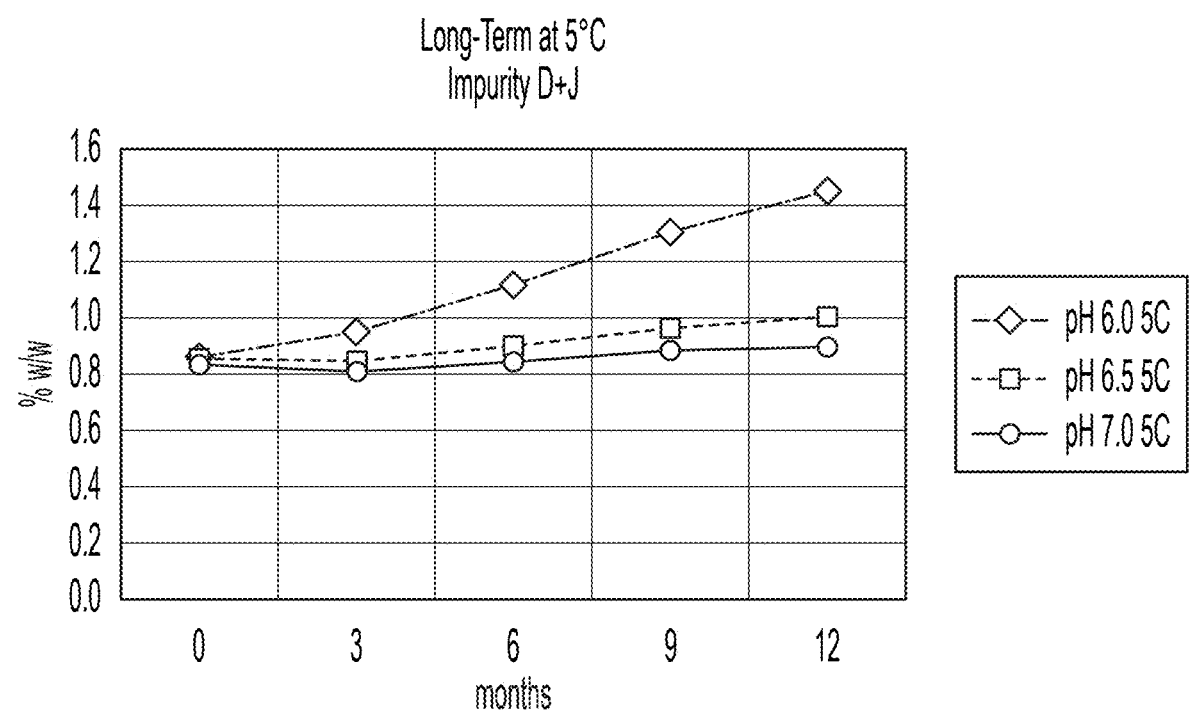
FIG. 5A is a graph showing results in Example 3 for azithromycin formulations D, E and F as measured by Impurities J+D (% w/w) change over time at 5° C. storage.
Figure 5B:
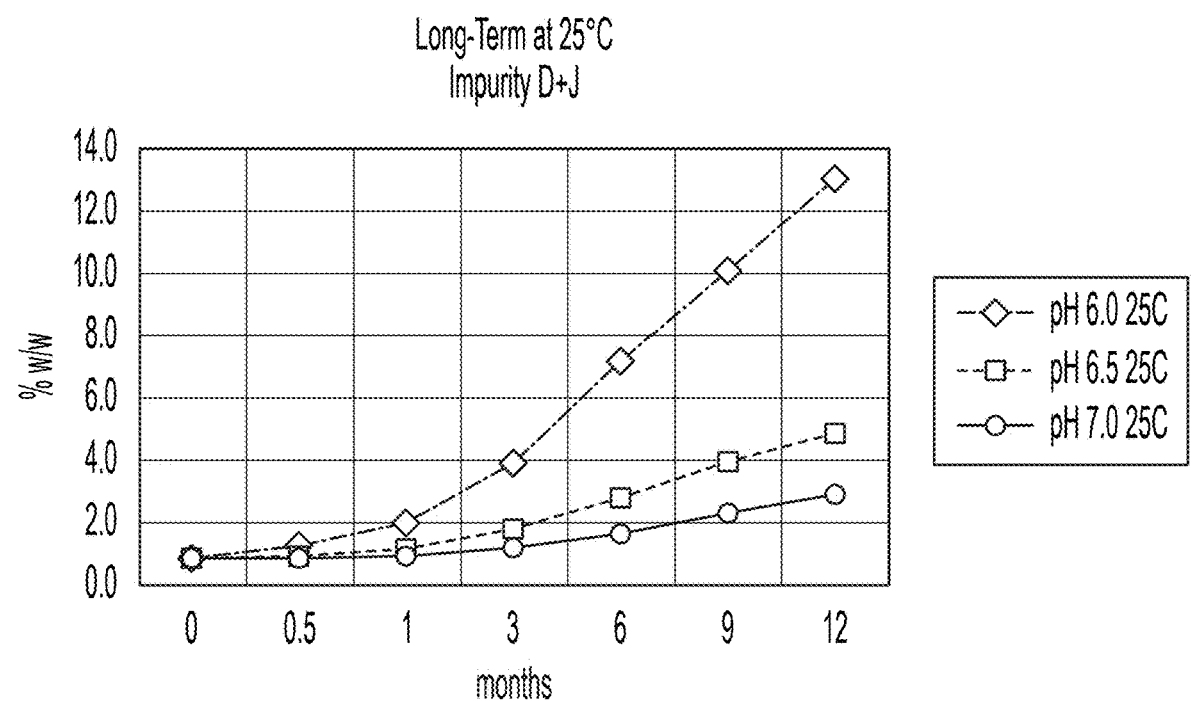
FIG. 5B is a graph showing results in Example 3 for azithromycin formulations D, E and F as measured by Impurities J+D (% w/w) change over time at 25° C. storage.

Regarding specific impurities, the largest known impurity observed in the samples was impurity J+D, which showed faster growth at more acidic pH during 5° C. and 25° C. storage. After 12 months stored at 5° C., impurity J+D was 1.5% at pH 6.0, 1.0% at pH 6.5, and 0.9% at pH 7.0 (Table 6B; FIG. 5A). This pH-dependent growth was even more apparent after 12 months at 25° C., where impurity J+D was 13.0% at pH 6.0, 4.9% at pH 6.5, and 2.9% at pH 7.0 (Table 6C; FIG. 5B). For short term storage, the 12-month interval had the largest change in impurity J+D from time-zero following 35 days 25° C.: +1.72% at pH 6.0, +0.52% at pH 6.5, and +0.22% at pH 7.0.

TABLE 6B

Formulations D, E and F: Impurities J + D (% w/w) over months at 5° C. storage

| Example | 0 M | 3 M | 6 M | 9 M | 12 M | Change from 0 M to 12 M |
|---|---|---|---|---|---|---|
| D | 0.86 | 0.95 | 1.12 | 1.30 | 1.45 | +0.59 |
| E | 0.85 | 0.84 | 0.90 | 0.96 | 1.00 | +0.15 |
| F | 0.83 | 0.81 | 0.84 | 0.88 | 0.90 | +0.07 |

TABLE 6C

Formulations D, E and F: Impurities J + D (% w/w) over months at 25° C. storage

| Example | 0 M | 3 M | 6 M | 9 M | 12 M | Change from 0 M to 12 M |
|---|---|---|---|---|---|---|
| D | 0.86 | 3.90 | 7.15 | 10.12 | 13.04 | +12.18 |
| E | 0.85 | 1.77 | 2.80 | 3.95 | 4.87 | +4.02 |
| F | 0.83 | 1.19 | 1.64 | 2.30 | 2.91 | +2.08 |

Example 4

A study compared three formulation variables: tonicity adjusting buffer (0.9% saline vs 5% dextrose), buffer (1.38 mg/mL sodium phosphate monobasic monohydrate vs 1.65 mg/mL anhydrous citric acid), and pH (5.5, 6.5, and 7.5). Formulations G-N are summarized in Table 7. All formulations were aseptically filled in 250 mL GALAXY® container system without terminal sterilization.

TABLE 7

Formulations G-N in Example 4

| Example | Azithromycin[1] | Tonicity Adjusting Agent | Buffer | pH |
|---|---|---|---|---|
| G | 2.0 mg/mL | 0.9% Saline | 1.38 mg/mL sodium phosphate | 5.5 |
| H | 2.0 mg/mL | 0.9% Saline | 1.38 mg/mL sodium phosphate | 6.5 |
| I | 2.0 mg/mL | 0.9% Saline | 1.38 mg/mL sodium phosphate | 7.5 |
| J | 2.0 mg/mL | 0.9% Saline | 1.65 mg/mL citric acid | 6.5 |
| K | 2.0 mg/mL | 5% Dextrose | 1.38 mg/mL sodium phosphate | 5.5 |
| L | 2.0 mg/mL | 5% Dextrose | 1.38 mg/mL sodium phosphate | 6.5 |
| M | 2.0 mg/mL | 5% Dextrose | 1.38 mg/mL sodium phosphate | 7.5 |
| N | 2.0 mg/mL | 5% Dextrose | 1.65 mg/mL citric acid | 6.5 |

[1]Added as Azithromycin Dihydrate

Solutions were stored at −20° C., 5° C., or 25° C. (Tables 8-13). Formulations H vs J (Table 9) and L vs N (Table 11) experienced similar relative stabilities over storage at −20° C., 5° C. and 25° C., showing 1.38 mg/mL sodium phosphate monobasic monohydrate and 1.65 mg/mL citric acid anhydrous buffering systems were interchangeable. Overall, formulations containing 5% dextrose resulted in higher total impurities levels (Table 13) compared to 0.9% saline (Table 12). As shown in Table 12, formulations at pH 6.5 resulted in lower total impurities levels compared to pH 5.5 and 7.5.

TABLE 8

Formulations G, H, I and J: Assay (mg/mL) over 0-24 months of storage at 5° C.

| Storage Temp | Example | 0 M | 3 M | 9 M | 15 M | 24 M | Change from 0 M to 15 M | Change from 0 M to 24 M |
|---|---|---|---|---|---|---|---|---|
| 5° C. | G | 1.99 | 2.05 | 1.98 | 1.99 | 1.93 | 0.00 | −0.06 |
|  | H | 2.00 | 2.05 | 2.00 | 2.01 | 1.99 | +0.01 | −0.01 |
|  | I | 1.97 | 2.03 | 1.94 | 1.93 | 1.84 | −0.04 | −0.13 |
|  | J | 2.00 | 2.04 | 1.98 | 2.01 | 1.94 | +0.01 | −0.06 |

TABLE 9

Formulations H and J: Assay (mg/mL) over 0-18 months of storage at −20° C. and 25° C.

| Storage Temp | Example | 0 M | 9 M | 15 M | 18 M |
|---|---|---|---|---|---|
| −20° C. | H | 2.00 | 1.99 | 2.00 | 2.04 |
|  | J | 2.00 | 1.99 | 2.01 | 2.06 |
| 25° C. | H | 2.00 | 1.82 | 1.73 | Not Tested |
|  | J | 2.00 | 1.81 | 1.74 | Not Tested |

TABLE 10

Formulations K, L, M and N: Assay (mg/mL) over 0-15 months of storage at 5° C.

| Example | 0 M | 3 M | 15 M | Change from 0 M to 15 M |
|---|---|---|---|---|
| K | 1.88 | 1.90 | 1.97 | +0.09 |
| L | 1.83 | 1.88 | 2.01 | +0.18 |

TABLE 10-continued

Formulations K, L, M and N: Assay (mg/mL) over
0-15 months of storage at 5° C.

| Example | 0 M | 3 M | 15 M | Change from 0 M to 15 M |
|---|---|---|---|---|
| M | 1.78 | 1.84 | 1.85 | +0.07 |
| N | 1.89 | 1.91 | 2.00 | +0.11 |

TABLE 11

Formulations L and N: Assay (mg/mL) over 0-15
months of storage at −20° C. and 25° C.

| Storage Temp | Example | 0 M | 3 M | 15 M |
|---|---|---|---|---|
| −20° C. | L | 1.85 | Not Tested | 2.00 |
|  | N | 1.89 |  | 2.02 |
| 25° C. | L | 1.85 | 1.83 | Not Tested |
|  | N | 1.89 | 1.85 |  |

TABLE 12

Formulations G, H, I and J: Total Impurities (% w/w)
over 0-24 months of storage at 5° C.

| Example | 0 M | 3 M | 9 M | 15 M | 24 M | Change from 0 M to 15 M | Change from 0 M to 24 M |
|---|---|---|---|---|---|---|---|
| G | 1.09 | 2.15 | 3.59 | 2.98 | 4.22 | +1.89 | +3.14 |
| H | 0.95 | 1.81 | 2.69 | 1.48 | 1.56 | +0.54 | +0.61 |
| I | 1.26 | 2.59 | 4.74 | 4.14 | 5.69 | +2.88 | +4.43 |
| J | 0.92 | 0.98 | 2.46 | 1.44 | 1.49 | +0.53 | +0.57 |

TABLE 13

Formulations K, L, M and N: Total Impurities (% w/w)
over 0-15 months of storage at 5° C.

| Example | 0 M | 3 M | 15 M | Change from 0 M to 15 M |
|---|---|---|---|---|
| K | 2.00 | 3.01 | 2.45 | +0.46 |
| L | 3.18 | 4.86 | 3.77 | +0.60 |
| M | 3.97 | 6.87 | 7.34 | +3.37 |
| N | 2.79 | 4.54 | 2.89 | +0.10 |

Figure 6A:
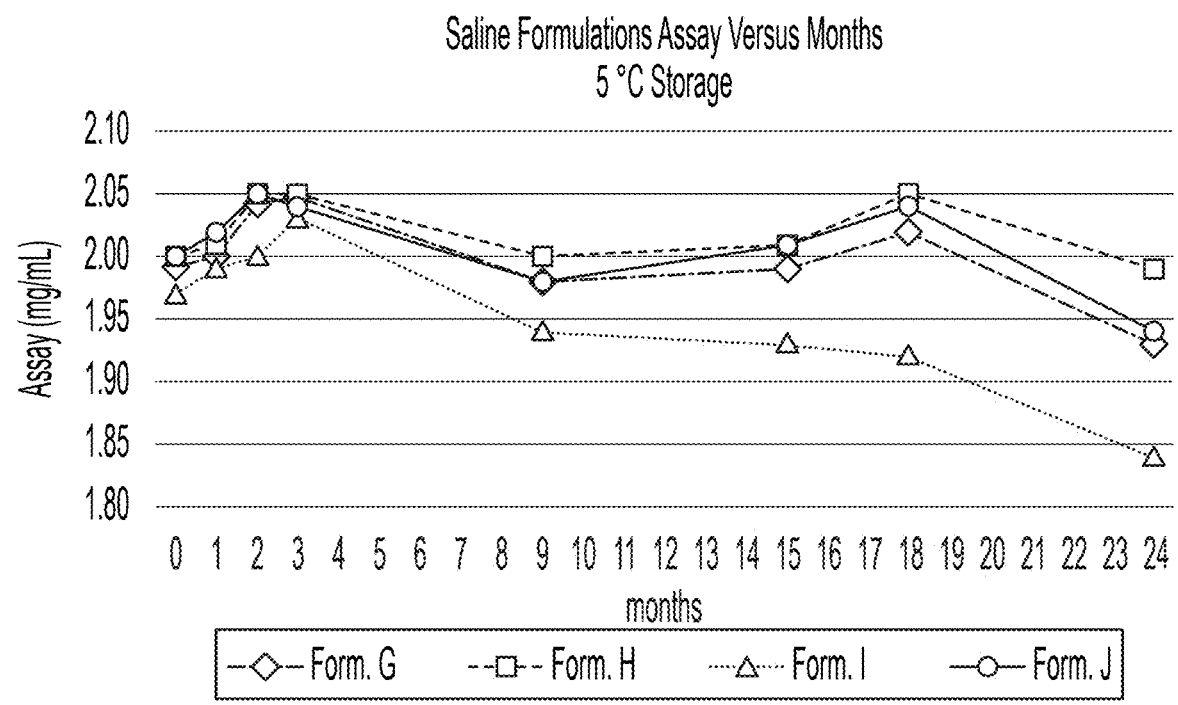
FIG. 6A is a graph showing results in Example 4 for azithromycin+saline formulations G, H, I and J as measured by assay (mg/mL) change over time at 5° C. storage.
Figure 6B:
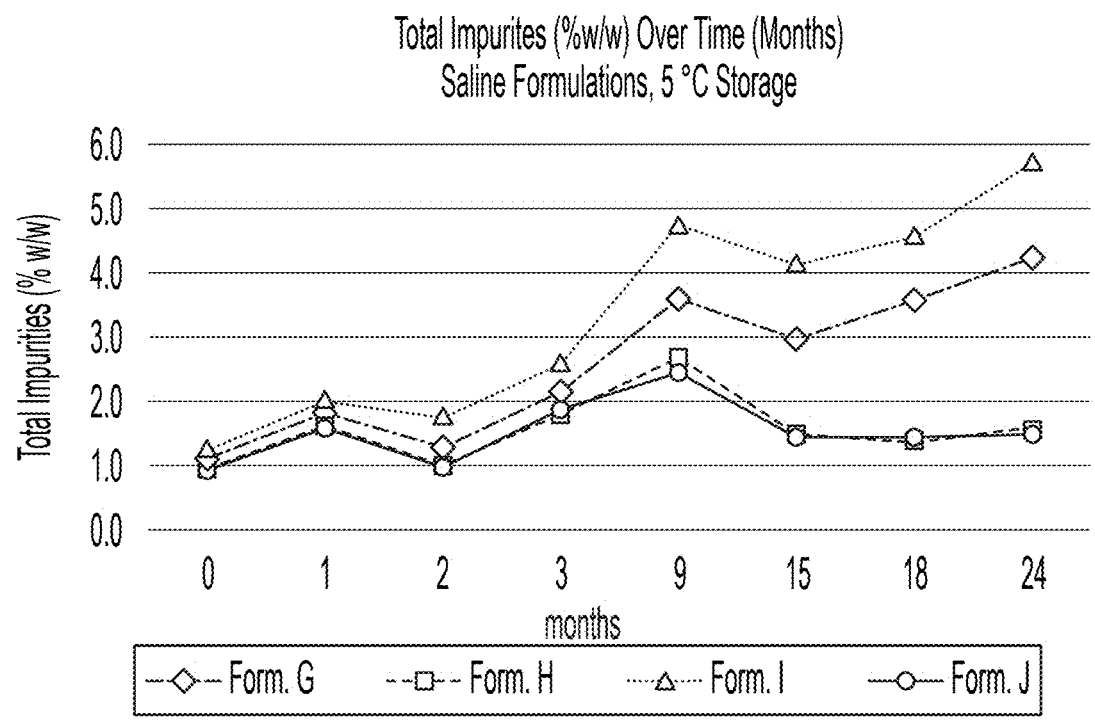
FIG. 6B is a graph showing results in Example 4 for azithromycin+saline formulations G, H, I and J as measured by total impurities (% w/w) change over time at 5° C. storage.
Figure 7:
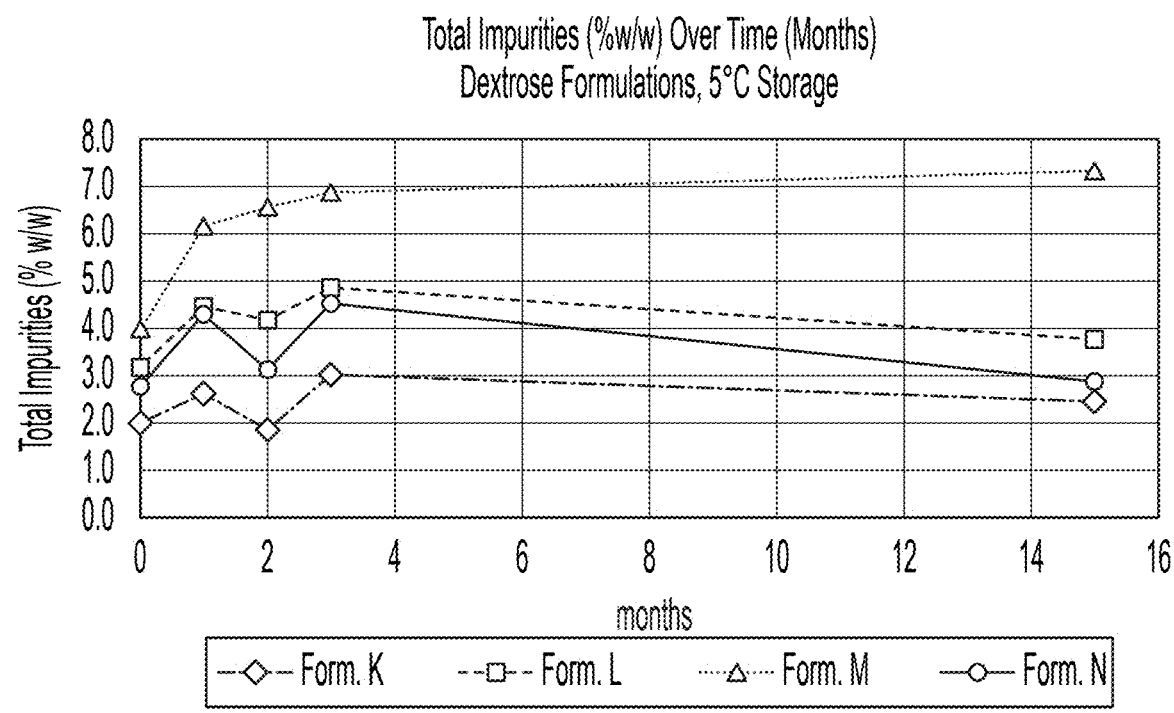
FIG. 7 is a graph showing results in Example 4 for azithromycin+dextrose formulations K, L, M and N as measured by total impurities (% w/w) change over time at 5° C. storage.

FIG. 6A shows assay (mg/mL) change over time for storage at 5° C. for Formulations G, H, I and J; and FIG. 6B shows total impurities (% w/w) change over time for storage at 5° C. for Formulations G, H, I and J; and FIG. 7 shows total impurities (% w/w) change over time for storage at 5° C. for Formulations K, L, M and N.

After 24 months at 5° C., samples formulated at pH 6.5 in 0.9% saline showed the highest assay values and the lowest total impurities values, with other measured parameters showing no effect versus pH levels among the solutions tested.

Figure 8A:
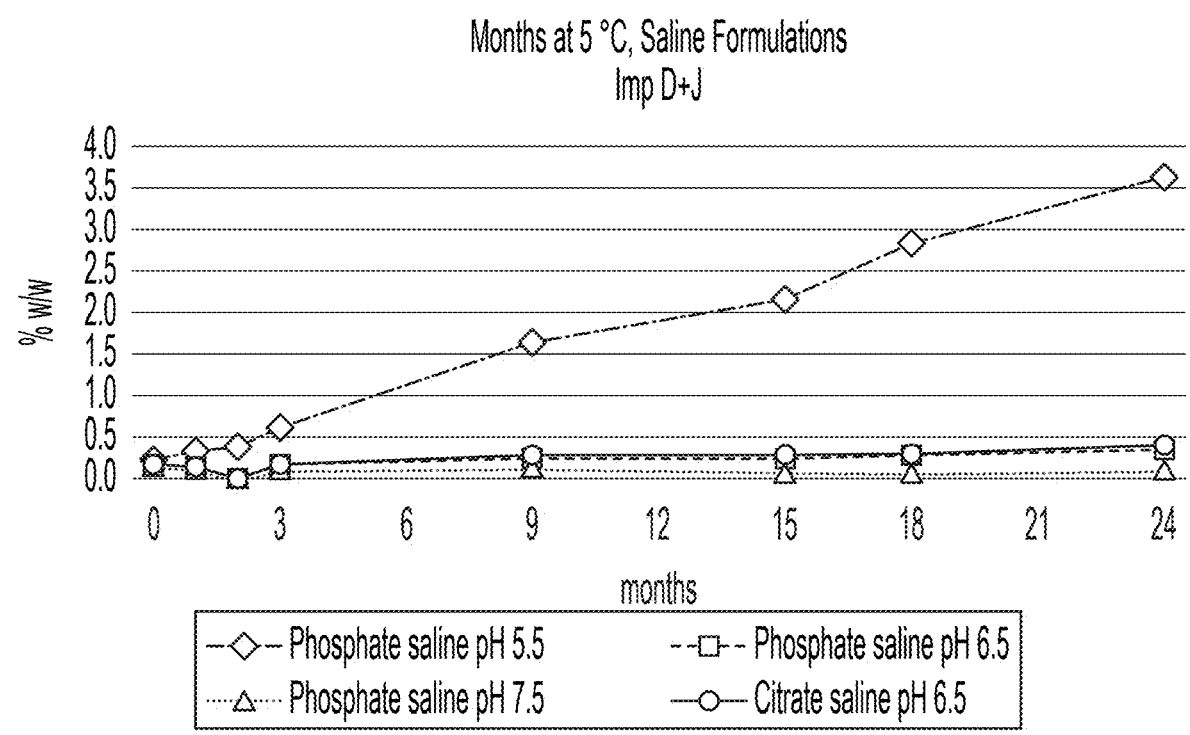
FIG. 8A is a graph showing results in Example 4 for azithromycin+saline formulations G, H, I and J as measured by Impurities J+D (% w/w) change over time at 5° C. storage.
Figure 8B:
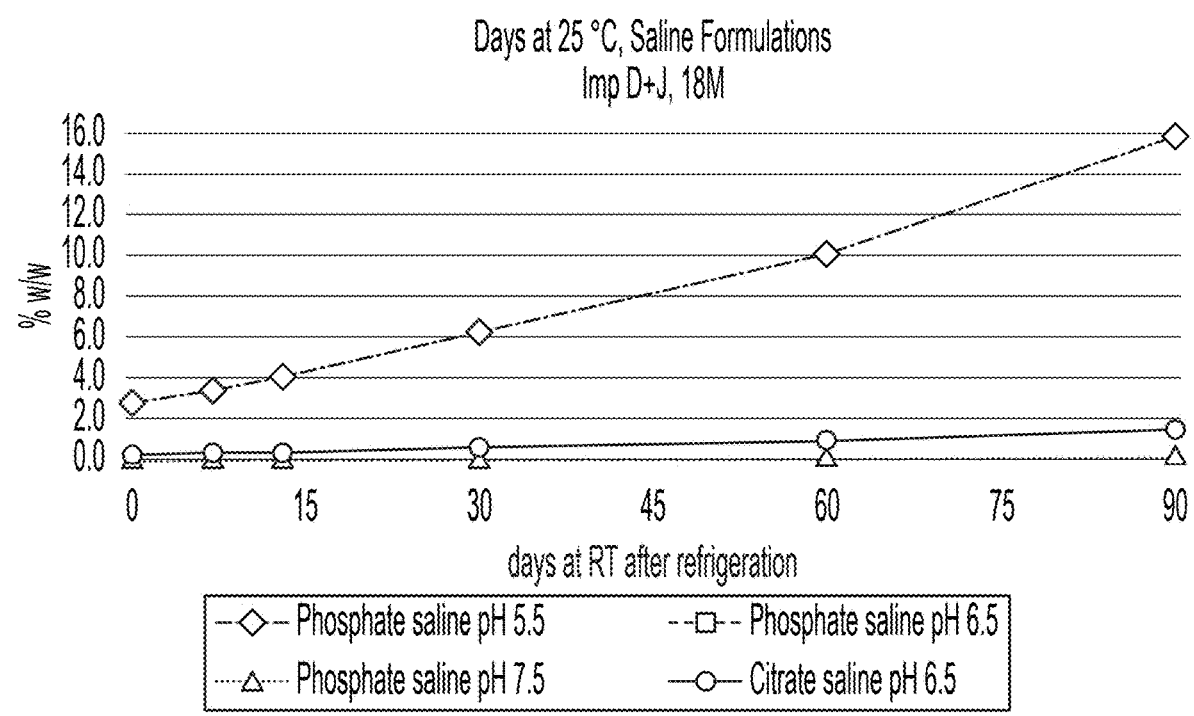
FIG. 8B is a graph showing results in Example 4 for azithromycin+saline formulations G, H, I and J as measured by Impurities J+D (% w/w) change over time at 25° C. storage. 30 day samples were stored for 17 months at 5° C. and then stored at 25° C. for 30 days; 60 day samples were stored for 16 months at 5° C. and then stored at 25° C. for 60 days; 90 day samples were stored for 15 months at 5° C. and then stored at 25° C. for 90 days; all samples were tested together with a fresh sample stored for 18 months at 5° C.

Regarding specific impurities, Impurity D and Impurity J (desosaminylazithromycin) co-eluted in the analytical method and were processed as one peak. Impurity D+J grew faster at lower pH in saline diluent (Table 14; FIG. 8A). After 24 months at 5° C., samples in phosphate saline at pH 5.5 experienced a +3.39% growth in Impurity D+J compared to the minimal growth at other pH levels. Impurity D+J experienced similar growth between citrate and phosphate buffering systems at target pH across 5° C. and 25° C. storage (FIGS. 8A and 8B).

TABLE 14

Impurity D + J (% w/w)

| Formulation | Time Zero | 24 M 5° C. | Change |
|---|---|---|---|
| Citrate Saline, pH 6.5 | 0.18 | 0.40 | +0.22 |
| Phosphate Saline, pH 5.5 | 0.23 | 3.62 | +3.39 |
| Phosphate Saline, pH 6.5 | 0.15 | 0.35 | +0.20 |
| Phosphate Saline, pH 7.5 | 0.14 | 0.09 | −0.05 |

Examples 5 and 6

Studies used azithromycin monohydrate as the active ingredient (instead of azithromycin dihydrate) and compared different tonicity adjusting agents (5% dextrose vs 0.9% saline) at different pH levels (pH 5.0-7.5). Formulations are described in Tables 15 and 18. All formulations were aseptically filled in 250 mL GALAXY® container system without terminal sterilization.

In summary, change in assay levels were relatively similar between all the formulations tested after storage at 5° C. (Tables 16 and 19). For total impurities, levels were similar at pH 6.0-7.5 in 0.9% saline after 3M of 5° C. storage, and total impurities for pH 5.0 were significantly higher (Table 17).

TABLE 15

Formulations O-T in Example 5

| Example | Azithromycin[1] | Tonicity Adjusting Agent | Buffer | pH |
|---|---|---|---|---|
| O | 2.0 mg/mL | 5% Dextrose | 1.65 mg/mL citric acid | 6.5 |
| P | 2.0 mg/mL | 0.9% Saline | 1.65 mg/mL citric acid | 5.0 |
| Q | 2.0 mg/mL | 0.9% Saline | 1.65 mg/mL citric acid | 6.0 |
| R | 2.0 mg/mL | 0.9% Saline | 1.65 mg/mL citric acid | 6.5 |
| S | 2.0 mg/mL | 0.9% Saline | 1.65 mg/mL citric acid | 7.0 |
| T | 2.0 mg/mL | 0.9% Saline | 1.65 mg/mL citric acid | 7.5 |

[1]Added as Azithromycin Monohydrate

TABLE 16

Formulations O-T: Assay (mg/mL)
over 0-3 months of storage at 5° C.

| Example | 1 M | 3 M |
|---|---|---|
| O | 2.15 | 2.29 |
| P | 2.05 | 2.07 |
| Q | 2.02 | 2.06 |
| R | 2.06 | 2.07 |
| S | 2.07 | 2.06 |
| T | 2.09 | 2.06 |

TABLE 17

Formulations O-T: Total Impurities (% w/w)
over 0-3 months of storage at 5° C.

| Example | 1 M | 3 M |
|---|---|---|
| O | 0.80 | 0.55 |
| P | 1.89 | 2.51 |

TABLE 17-continued

Formulations O-T: Total Impurities (% w/w) over 0-3 months of storage at 5° C.

| Example | 1 M | 3 M |
|---|---|---|
| Q | 1.51 | 1.30 |
| R | 1.61 | 1.30 |
| S | 1.78 | 1.33 |
| T | 1.86 | 1.37 |

TABLE 18

Formulations U-X in Example 6

| Example | Azithromycin[1] | Tonicity Adjusting Agent | Buffer | pH |
|---|---|---|---|---|
| U | 2.0 mg/mL | 0.9% Saline | 1.65 mg/mL citric acid | 6.6 |
| V | 2.0 mg/mL | 0.9% Saline | 1.65 mg/mL citric acid | 6.0 |
| W | 2.0 mg/mL | 5% Dextrose | 1.65 mg/mL citric acid | 7.0 |
| X | 2.0 mg/mL | 5% Dextrose | 1.65 mg/mL citric acid | 5.7 |

[1]Added as Azithromycin Monohydrate

TABLE 19

Formulations U-X: Assay (mg/mL) over 0-6 months of storage at 5° C.

| Example | 0 M | 6 M |
|---|---|---|
| U | 1.97 | 1.98 |
| V | 2.04 | 1.98 |
| W | 1.93 | 1.94 |
| X | 2.02 | 1.96 |

This data indicates that Azithromycin Monohydrate performed similarly to Azithromycin Dihydrate at pH 6.0-7.5 in 0.9% saline after 3M of 5° C. storage.

Example 7

A study investigated terminal sterilization of a premixed 2 mg/mL azithromycin dihydrate formulation in 0.9% sodium chloride diluent and 1.65 mg/mL citric acid buffer at pH 6.5 (Formulation B from Example 2). The study demonstrated chemical instability of the azithromycin at high temperatures and the necessity of aseptic fill during manufacturing. Specifically, the formulation was transferred to a flexible plastic container fabricated from a multilayer sheeting composed of polypropylene (PP), polyamide (PA) and polyethylene (PE) and exposed to the following sterilization cycle (which is appropriate for this container): 17.61 minutes at 244.6° F. (118.1° C.). Post-sterilized test articles were placed at 5° C. storage until testing. Control articles remained in flexible containers at target storage temperature (5° C.).

Units that were exposed to terminal sterilization showed a decrease in pH (pH 6.23) compared to control units (pH 6.41). There was a significant degradation of azithromycin when units were exposed to terminal sterilization temperatures. Test articles reported an 80.9% label claim (1.62 mg/mL), while control articles remained at 101.5% label claim (2.03 mg/mL).

Due to the large degradation of azithromycin in test articles, there was a corresponding increase in total impurities in units exposed to terminal sterilization (18.83% w/w) compared to the control units (0.92% w/w). The largest increases (>0.5% w/w) in impurity quantities in test articles compared to the controls occurred for the following: Impurity RRT 0.16 (+10.77% w/w), Impurity RRT 0.30 (+1.88% w/w), Impurity RRT 0.34 (+1.62% w/w), Impurity RRT 0.54 (+0.57% w/w), and Impurity J+D (+2.12% w/w).

Overall, there were significant differences in pH, assay, and impurities between terminally sterilized units compared to control units. Terminal sterilization is not feasible for an azithromycin premix solution; instead, the solution should be aseptically filled.

Various changes and modifications to the presently preferred embodiments disclosed herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An aseptically prepared pharmaceutically acceptable azithromycin premix formulation comprising:
   i) azithromycin,
   ii) water, and
   (iii) at least one tonicity adjuster,
   wherein the azithromycin premix formulation has a pH value of 5.5 to 7.5.

2. The aseptically prepared pharmaceutically acceptable azithromycin premix formulation according to claim 1, wherein the formulation is aseptically filled and has not undergone terminal sterilization, and the azithromycin premix formulation has no greater than about 4.0% total impurities (% w/w), and/or no greater than 2.0% impurities J+D (% w/w) on shelf life after twelve months storage at refrigerated temperatures, as measured by the UPLC method disclosed herein.

3. The aseptically prepared pharmaceutically acceptable azithromycin premix formulation according to claim 1, wherein the azithromycin premix formulation is sterile.

4. The aseptically prepared pharmaceutically acceptable azithromycin premix formulation according to claim 1, comprising about 1.0 mg/mL to about 3.0 mg/mL of the azithromycin.

5. The aseptically prepared pharmaceutically acceptable azithromycin premix formulation according to claim 1, comprising about 2.0 mg/mL of the azithromycin.

6. The aseptically prepared pharmaceutically acceptable azithromycin premix formulation according to claim 1, wherein the azithromycin premix formulation has a pH value of 6.3 to 6.7.

7. The aseptically prepared pharmaceutically acceptable azithromycin premix formulation according to claim 6, wherein the formulation is aseptically filled and has not undergone terminal sterilization, and the azithromycin premix formulation maintains the pH at 6.2 to 6.8 over shelf life after twelve months storage at refrigerated temperatures.

8. The aseptically prepared pharmaceutically acceptable azithromycin premix formulation according to claim 1, wherein the tonicity adjuster is sodium chloride.

9. The aseptically prepared pharmaceutically acceptable azithromycin premix formulation according to claim 8, wherein the sodium chloride is about 0.80%-1.00% by weight of the formulation.

10. The aseptically prepared pharmaceutically acceptable azithromycin premix formulation according to claim 1, wherein the azithromycin premix formulation further comprises at least one buffer.

11. The aseptically prepared pharmaceutically acceptable azithromycin premix formulation according to claim 10, wherein the at least one buffer is a citrate buffer and/or a phosphate buffer.

12. An aseptically prepared pharmaceutically acceptable azithromycin premix formulation consisting essentially of water, azithromycin, a tonicity adjuster, and at least one buffer,
wherein the azithromycin premix formulation has a pH value of 5.5 to 7.5.

13. A method of manufacturing a pharmaceutically acceptable azithromycin premix formulation, the method comprising at least one step selected from the group consisting of (i) adjusting the pH of a composition comprising water and azithromycin to a pH value of 5.5 to 7.5, and (ii) adding azithromycin to water having a pH value of 5.5 to 7.5, to form a composition; the method further comprising aseptically preparing the composition without terminal sterilization.

14. The method according to claim 13, further comprising adding at least one buffer and/or at least one tonicity adjuster to the composition before, during and/or after the adjusting of the pH; and mixing the composition until homogeneous.

15. The method according to claim 13, further comprising sterilizing a container comprising at least one plastic material; and aseptically filling the pharmaceutically acceptable azithromycin premix formulation into the sterilized container.

16. The method according to claim 13, wherein the azithromycin premix formulation has no greater than about 4.0% total impurities (% w/w), and/or no greater than 2.0% impurities J+D (% w/w) on shelf life, after twelve months storage at refrigerated temperatures, as measured by any method disclosed herein.

17. The method according to claim 13, wherein the azithromycin premix formulation has a pH value of 6.3 to 6.7.

18. The method according to claim 17, wherein the azithromycin premix formulation maintains the pH at 6.2 to 6.8 over shelf life after twelve months storage at refrigerated temperatures, as measured by any method disclosed herein.

19. An aseptically filled pharmaceutically acceptable azithromycin premix product comprising a container comprising at least one plastic material, the product further comprising a pharmaceutically acceptable azithromycin premix formulation comprising i) azithromycin and ii) water,
wherein the azithromycin premix formulation has a pH value of 5.5 to 7.5, and
wherein the product has not undergone terminal sterilization.

20. The aseptically filled pharmaceutically acceptable azithromycin premix product according to claim 19, wherein the container has a volume of about 1.0 mL to about 1000.0 mL.

21. The aseptically filled pharmaceutically acceptable azithromycin premix product according to claim 19, wherein the at least one plastic material comprises a first plastic material, wherein the flexible container has an inner surface layer contacting the azithromycin premix formulation, wherein the inner surface layer comprises the first plastic material, and the first plastic material is selected from the group consisting of a linear low density polyethylene (LLD PE), a polyvinyl chloride (PVC), a polypropylene (PP), a copolymer, and a modified polymer or copolymer.

\* \* \* \* \*